T. J. MULLEN & T. F. BRENNAN.
PNEUMATIC RUNNING GEAR FOR VEHICLES.
APPLICATION FILED JAN. 7, 1915.
1,258,355.  Patented Mar. 5, 1918.
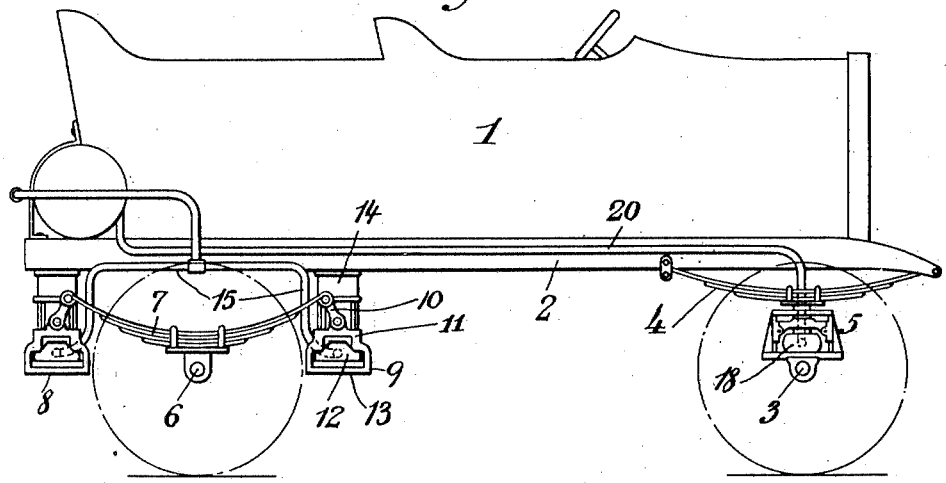
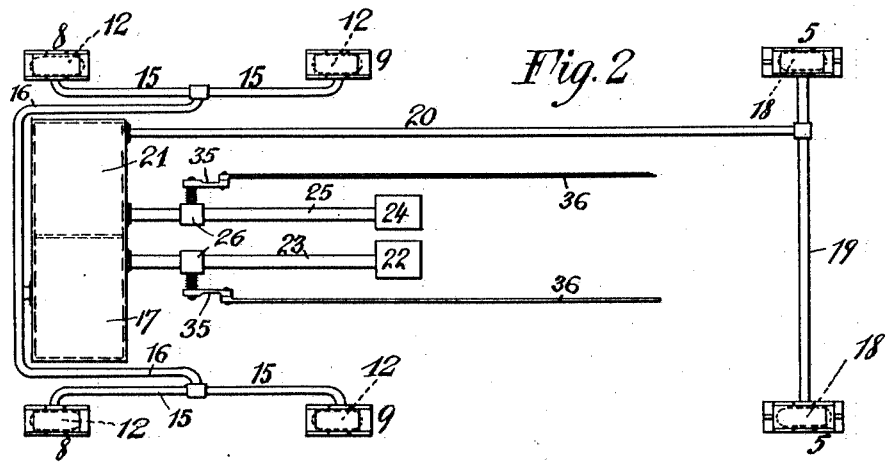
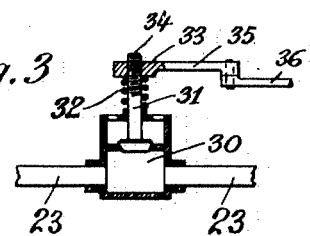
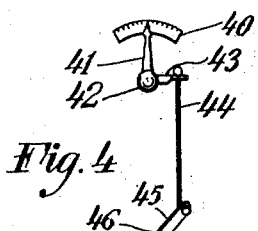
Witnesses:
Thomas Howie
S. M. Baedler
Inventor
Thomas J. Mullen
Thomas F. Brennan
By their Attorneys
Mastich & Lucke

UNITED STATES PATENT OFFICE.

THOMAS J. MULLEN, OF NEW BRIGHTON, AND THOMAS F. BRENNAN, OF TOMPKINS-VILLE, NEW YORK.

PNEUMATIC RUNNING-GEAR FOR VEHICLES.

1,258,355.

Specification of Letters Patent. Patented Mar. 5, 1918.

Application filed January 7, 1915. Serial No. 936.

*To all whom it may concern:*

Be it known that we, THOMAS J. MULLEN and THOMAS F. BRENNAN, citizens of the United States of America, and residents of New Brighton and Tompkinsville, respectively, county of Richmond, State of New York, have invented certain new and useful Improvements in Pneumatic Running-Gears for Vehicles, of which the following is a specification.

This invention relates to running gears for self-propelled and other vehicles. More specifically, this invention relates to running gears comprising pneumatic elements in combination with one or more reservoirs and pressure regulating or controlling means connected with such pneumatic elements whereby to secure proper buoyancy of the load formed by the weight of the car and the weight of the passengers or other "live" load therein. In the preferred forms of our invention as applied to automobiles, the pressure of the pneumatic medium within the pneumatic elements controlling the rear axle is related differentially, *i. e.* of desired increased or decreased amount as compared with the pressure of the pneumatic medium within the pneumatic elements of the front axle. In such preferred forms the pneumatic compressing means may be driven by the engine of the car, or by an auxiliary engine, or operated upon the relative vibration of the body of the car with respect to the chassis during the course of running the vehicle. Such pump or equivalent means is preferably operated to charge the pneumatic system whenever the pressure falls below the desired pressure.

One form of a pneumatic element is shown and described in our U. S. Patent No. 1,049,512, granted to us on January 7, 1913, and comprises two relatively movable parts acting on opposing sides of a pneumatic resilient bag, one of said movable parts being connected to an axle and the other movable part being connected to the center of the axle spring. In the present invention, a pneumatic element is interposed between the ends of the axle springs and the chassis or frame of the vehicle. Preferably, such pneumatic element is interposed between each end of an axle spring and the chassis or frame as for example, by connecting each end of the springs of the rear axle to one of such relatively movable parts of a pneumatic element and connecting the other relatively movable part to the chassis or frame of the vehicle. The two pneumatic elements thus arranged with respect to each spring of the rear axle are interconnected with each other and also with a reservoir and pumping device by suitable means. It is desirable to dispose gages for the pneumatic systems as reservoirs on the dash-board of the vehicle, convenient for observation by the driver and to provide suitable pressure regulating and indicating means on the dash-board whereby to readily adjust the pressures of the respective pneumatic systems or reservoirs. The reservoirs may be arranged as separate reservoirs and distributed at different points on the body of the chassis of the car, or the reservoirs, may be assembled as a unitary structure and disposed, for example, at the rear or other suitable portion of the chassis.

Other features and objects of our invention will be more clearly understood from the following description and the accompanying drawings, in which—

Figure 1 is a side elevation of a vehicle equipped with a pneumatic running gear in accordance with our invention;

Fig. 2 is a diagrammatic plan view of Fig. 1;

Fig. 3 is a detail of a regulating valve with its pressure adjusting means; and

Fig. 4 is a detail view of one form of a pressure regulator and indicator.

Referring to Fig. 1, the body 1 and the chassis 2 are shown of conventional form. The front axle 3 is connected at opposite ends with the chassis 2 by means of the spring 4, shown as a leaf spring, and the pneumatic element 5, in a manner similar to the arrangement disclosed in our said United States Patent No. 1,049,512.

The rear axle 6 is connected at its opposite ends to a spring 7, the ends of which are each connected to separate pneumatic elements 8, 9. More specifically, each end of spring 7 is connected to a link 10 which in turn in connected to the part 11 acting on the lower surface of the pneumatic resilient bag 12, the upper surface of which is acted upon by the part 13 carried by the abutment 14 fixed to the chassis 2. The interior of the pneumatic resilient bag 12 communicates through the piping 15, preferably flexible, with the main piping 16 leading to the reservoir 17. Each pneumatic resilient bag 18 of the front pneumatic elements 5, 5, communicates through the piping 19, preferably flexible, with the main piping 20 leading to the reservoir 21. Such main piping and reservoirs are preferably carried by the chassis and are preferably strapped thereto to preclude vibration.

The reservoir 17 for the pneumatic elements of the rear axle and the reservoir 21 for the pneumatic elements of the front axle may be placed side by side, as shown, or otherwise. The reservoir 17 is supplied with air or other suitable pneumatic medium by means of the pump 22 connected thereto by the piping 23, and the reservoir 21 may be supplied with air or other suitable medium by means of the pump 24 connected thereto by piping 25. In each of the pipings 23, 25 is disposed a suitable pressure regulating valve 26 whereby to adjust the pressures of the respective reservoirs in conformity to the amount and distribution of the load on the car.

One form of suitable pressure regulating valve is illustrated in Fig. 3 and comprises the main valve chamber 30 in communication with the piping leading to a reservoir, and a movable valve member 31 controlled by the spring 32 adjusted by means of the nut 33 threaded on the valve stem 34. The nut 33 is provided with the arm 35 connected to the link 36 whereby upon proper movement of link 36 the tension of spring 32 is adjusted for the desired increased or decreased pressure within the reservoir. In Fig. 4 we have shown one form of a pressure regulating and indicating device, suitable for attachment to the dash-board of the vehicle, and comprising the scale 40, the pointer 41 provided with the milled head 42 and connected through the arm 43 with the link 44 connected to one arm 45 of the bell crank 46, the other arm 47 being connected to the link 36. Thus upon grasping the milled head 42 and turning the pointer 41 to the left (Fig. 4) the link 44 will be raised, the link 36 moved forwardly and the nut 33 will be turned to compress more strongly the spring 32, thereby accordingly increasing the pressure required for dislodging the movable valve 31, and securing an increased pressure of the pneumatic medium. Similarly upon turning the pointer 41 to the right the nut 33 will be turned to release the tension of the spring and thereby secure a reduced pressure of the pneumatic medium.

The pumps 22, 24 or equivalent means may be operated by the vehicle engine, as in the case of a self-propelled vehicle, or an auxiliary or supplementary engine may be provided for operating the pumps. Also, the pumps may be operated by connecting the cylinder of each pump with the chassis and the plunger of each pump with the body of the car, or vice versa, whereby upon relative vertical vibration during the course of travel of the car, each pump will be operated to suitably charge the respective reservoirs.

Each pneumatic element is preferably provided with means for resiliently resisting lateral or side movement of the vehicle without affecting the proper movement of the relatively movable parts acting upon the pneumatic resilient bag, similar to the like provision described in our aforesaid Patent No. 1,049,512.

It will be noted that, we have illustrated our invention by reference to the running gear of the rear axle of an automobile; however, our invention is not limited to the running gear for rear axles and is as well applicable to the front axle of an automobile and also to any intermediate or other axle of any car or other type of vehicle. Our invention is of particular advantage when applied to the rear axle of an automobile owing to the relatively greater proportion of the total load being sustained by the rear axle and owing to the relatively wide limits of variability of the rear axle load. By reason of the relation of the parts comprising our invention, the rigidity of the wheels, axle and axle springs are maintained at maximum while at the same time the rebounds of the wheels due to obstacles encountered in the roadway or to road inequalities, etc., are precluded from transmission to the chassis. We have found that the provision of the interconnection of the fore and aft pneumatic elements attached to each spring secures a marked improvement in the buoyancy of the car irrespective of the nature of the disturbance set up in one or both of the wheels secured to the axle. Such improved buoyancy is increased by the further pneumatic interconnection of the resilient elements of both wheels carried by the axle. The provision of the pressure regulating means enables the driver to adjust the pressure of the pneumatic medium within the resilient elements controlling any particular axle, whereby upon increased load on such axle the pressure may be correspondingly increased and upon decreased load on such axle the pressure of the pneumatic medium may be correspondingly decreased.

Whereas we have illustrated our invention by reference to specific forms thereof, it will be understood that many changes and modifications may be made without departing from the spirit of our invention.

What we claim and desire to secure by Letters Patent is:—

1. The combination with a vehicle having front and rear axles, of a plurality of pneumatic elements for the front axle, a reservoir, means continuously connecting said front pneumatic elements in common with said reservoir, a plurality of pneumatic elements for the rear axle, a reservoir, means continuously connecting said rear pneumatic elements in common with said second named reservoir, a valve for regulating independently at will the pressure of said first named common reservoir, and a valve for regulating independently at will the pressure of said second named common reservoir.

2. The combination with a vehicle having front and rear axles, of a plurality of pneumatic elements for the front axle, a reservoir, means continuously connecting said reservoir in common with said front pneumatic elements, a plurality of pneumatic elements for the rear axle, a reservoir, means continuously connecting said second named reservoir in common with said rear pneumatic elements, a manually operated valve for regulating independently at will the pressure of said first named common reservoir, and a manually operated valve for regulating independently at will the pressure of said second named common reservoir.

3. The combination with a vehicle having front and rear axles, of a plurality of pneumatic elements for the front axle, a reservoir, means continuously connecting said front pneumatic elements in common with said reservoir, a reservoir, means continuously connecting said rear pneumatic elements in common with said second named reservoir, a manually operated valve for regulating independently at will the pressure of said first named common reservoir, a pressure indicator for said valve, a manually operated valve for regulating independently at will the pressure of said second named common reservoir and a pressure indicator for said second named valve.

In testimony whereof we have signed this specification in the presence of two subscribing witnesses.

THOMAS J. MULLEN.
THOMAS F. BRENNAN.

Witnesses:
K. G. LE ARD,
HENRY J. LUCKE.